United States Patent
Sasaki et al.

(10) Patent No.: US 7,723,598 B2
(45) Date of Patent: May 25, 2010

(54) ELECTRONIC PROOF SYSTEM AND MUSICAL INSTRUMENT EQUIPPED WITH THE SAME

(75) Inventors: Tsutomu Sasaki, Hamamatsu (JP); Yuji Fujiwara, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 59 days.

(21) Appl. No.: 12/132,635

(22) Filed: Jun. 4, 2008

(65) Prior Publication Data
US 2008/0314230 A1     Dec. 25, 2008

(30) Foreign Application Priority Data
Jun. 22, 2007   (JP)   ............... 2007-164842

(51) Int. Cl.
*G09B 15/04*   (2006.01)
*G10H 1/00*    (2006.01)

(52) U.S. Cl. .................. 84/477 R; 84/470 R; 84/478; 84/719; 84/744

(58) Field of Classification Search .......... None
See application file for complete search history.

(56) References Cited

U.S. PATENT DOCUMENTS

| | | | | |
|---|---|---|---|---|
| 6,359,207 B1 * | 3/2002 | Oba et al. | | 84/658 |
| 6,362,405 B2 * | 3/2002 | Koseki et al. | | 84/2 |
| 6,933,435 B2 * | 8/2005 | Kato et al. | | 84/724 |
| 2005/0150361 A1 * | 7/2005 | Muramatsu et al. | | 84/626 |
| 2005/0204908 A1 | 9/2005 | Uehara | | |
| 2006/0065103 A1 * | 3/2006 | Sasaki | | 84/600 |
| 2008/0229908 A1 * | 9/2008 | Sasaki | | 84/600 |
| 2008/0236363 A1 * | 10/2008 | Ohta | | 84/600 |

FOREIGN PATENT DOCUMENTS

| JP | 06-067653 | 3/1994 |
|---|---|---|
| JP | 2005-265903 | 9/2005 |

* cited by examiner

*Primary Examiner*—Marlon T Fletcher
(74) *Attorney, Agent, or Firm*—Harness, Dickey & Pierce, PLC

(57) ABSTRACT

An electronic proof system is provided in association with an automatic player piano; while a human player is practicing a music tune on the acoustic piano, the electronic proof system monitors the pedals of piano to see whether or not the player brings the pedals to target pedal positions; if the current pedal position is spaced from the target pedal position, the electronic proof system gives rise to fine vibrations of the pedal, and makes the player notice the pedal staying at incorrect pedal position through the tactile impression.

20 Claims, 9 Drawing Sheets

ELECTRONIC PROOF SYSTEM AND MUSICAL INSTRUMENT EQUIPPED WITH THE SAME

FIELD OF THE INVENTION

This invention relates to a musical instrument and, more particularly, to a musical instrument with an electronic proof system for music students and an electric system serving as the electronic proof system.

DESCRIPTION OF THE RELATED ART

It is not easy to make progress in musical instruments. There have been proposed various assisting devices and various assisting systems for music students. An electronic assisting system is adapted to guide a music student in their fingering on an acoustic piano by slightly sinking the black keys and white keys of a keyboard musical instrument immediately before the music student is to depress the black keys and white keys. A typical example of the electronic assisting system is disclosed in Japan Patent Application laid-open No. Hei 6-67653. The prior art electronic assisting system disclosed in the Japan Patent Application laid-open is hereinafter referred to as "the prior art electronic proof system." The prior art electronic proof system is provided for electronic keyboards with built-in effectors. The prior art electronic proof system monitors the black keys and white keys of electronic keyboards to see whether or not a music student mistakenly depresses a black key or a white key instead of the key to be depressed. When the music student mistakenly depresses a key, the prior art electronic proof system imparts a predetermined effect to the electronic tone so as to notify the music student of the incorrect fingering.

Another example of the prior art electronic assisting system is disclosed in Japan Patent Application laid-open No. 2005-265903. The prior art electronic assisting system is provided for a piano, and preliminarily informs a music student of the stroke over which a pedal is to be depressed through a visual image. A display panel is embedded in a front panel of the piano cabinet, and the visual image is produced in the display panel. Pieces of pedal data expressing the stroke of pedal have been prepared for music students through a performance by a skillful pianist, and are stored in a data storage of the prior art electronic assisting system. While the music student is performing a music tune, the prior art electronic assisting system monitors the fingering on the keyboard and steps on the pedals with reference to pieces of music data expressing the music tune. When the music student gets close to a note at which a pedal is to be depressed, the prior art electronic assisting system produces a visual image expressing the pedal stroke on the display panel on the basis of the pieces of pedal data. Although the music student hardly sees the pedals of pianos during the performance of a skillful pianist, he or she can learn the pedaling through the visual images on the display panel.

A problem is encountered in the prior art electronic proof system in that the application of prior art electronic proof system is limited to the electronic keyboards with built-in effectors.

Another problem inherent in the prior art electronic proof system is that the player feels the notice through the addition of effect to the tone less discriminative in the performance of chords. Although the effect is imparted to the incorrect tone, the incorrect tone is mixed with other tones through the mixer, and those tones are concurrently produced. If the player has an exact ear for the pitch of tones, he or she can recognize the incorrect tone. However, if not, he or she feels it difficult to determine what tone is incorrect.

A problem inherent in the prior art electronic assisting system is that the music student learns the pedaling only when he or she fixes his or her eyes on the display panel. If the music student continuously reads the music score during the performance, by way of example, the prior art electronic assisting system is useless for him or her.

SUMMARY OF THE INVENTION

It is therefore an important object of the present invention to provide an electronic proof system, which gives a player a notice of incorrect manipulation on a manipulator through an impression except for the sense of sight and sense of hearing.

It is also an important object of the present invention to provide a musical instrument, which is equipped with the electronic proof system.

To accomplish the objects of the present invention, the present invention proposes to give a notice through the tactile impression of a player.

In accordance with one aspect of the present invention, there is provided an electronic proof system for giving a notice of incorrect manipulation on a manipulator manipulated for changing an attribute of music sound comprising a data storage storing pieces of music data expressing the amount of target variation of the manipulator, a detector monitoring the manipulator and producing pieces of detected data expressing the amount of actual variation of the manipulator, an actuator provided for the manipulator and responsive to a driving signal so as to move the manipulator and a controller having a data processing capability, connected to the data storage, the detector and the actuator, comparing the amount of target variation with the amount of actual variation to see whether or not the manipulator is properly manipulated, and supplying the driving signal to the actuator in the presence of a certain amount of difference between the amount of target variation and the amount of actual variation so as to give the notice through a tactile impression on the manipulator to a player.

In accordance with another aspect of the present invention, there is provided a musical instrument for producing music sound comprising at least one manipulator moved along a trajectory by a player and used for changing an attribute of the music sound, a tone generator connected to the aforesaid at least one manipulator and producing the music sound having the attribute and an electronic proof system giving a notice of incorrect manipulation on the aforesaid at least one manipulator manipulated for changing the attribute of music sound and including a data storage storing pieces of music data expressing the amount of target variation of the aforesaid at least one manipulator, a detector monitoring the aforesaid at least one manipulator and producing pieces of detected data expressing the amount of actual variation of the aforesaid at least one manipulator, an actuator provided for the foresaid at least one manipulator and responsive to a driving signal so as to move the aforesaid at least one manipulator and a controller having a data processing capability, connected to the data storage, the detector and the actuator, comparing the amount of target variation with the amount of actual variation to see whether or not the manipulator is properly manipulated and supplying the driving signal to the actuator in the presence of a certain amount of difference between the amount of target variation and the amount of actual variation so as to give the notice through a tactile impression on the aforesaid at least one manipulator to the player.

BRIEF DESCRIPTION OF THE DRAWINGS

The features and advantages of the electronic proof system and musical instrument will be more clearly understood from the following description taken in conjunction with the accompanying drawings, in which.

DESCRIPTION OF THE PREFERRED EMBODIMENTS

Figure 1:
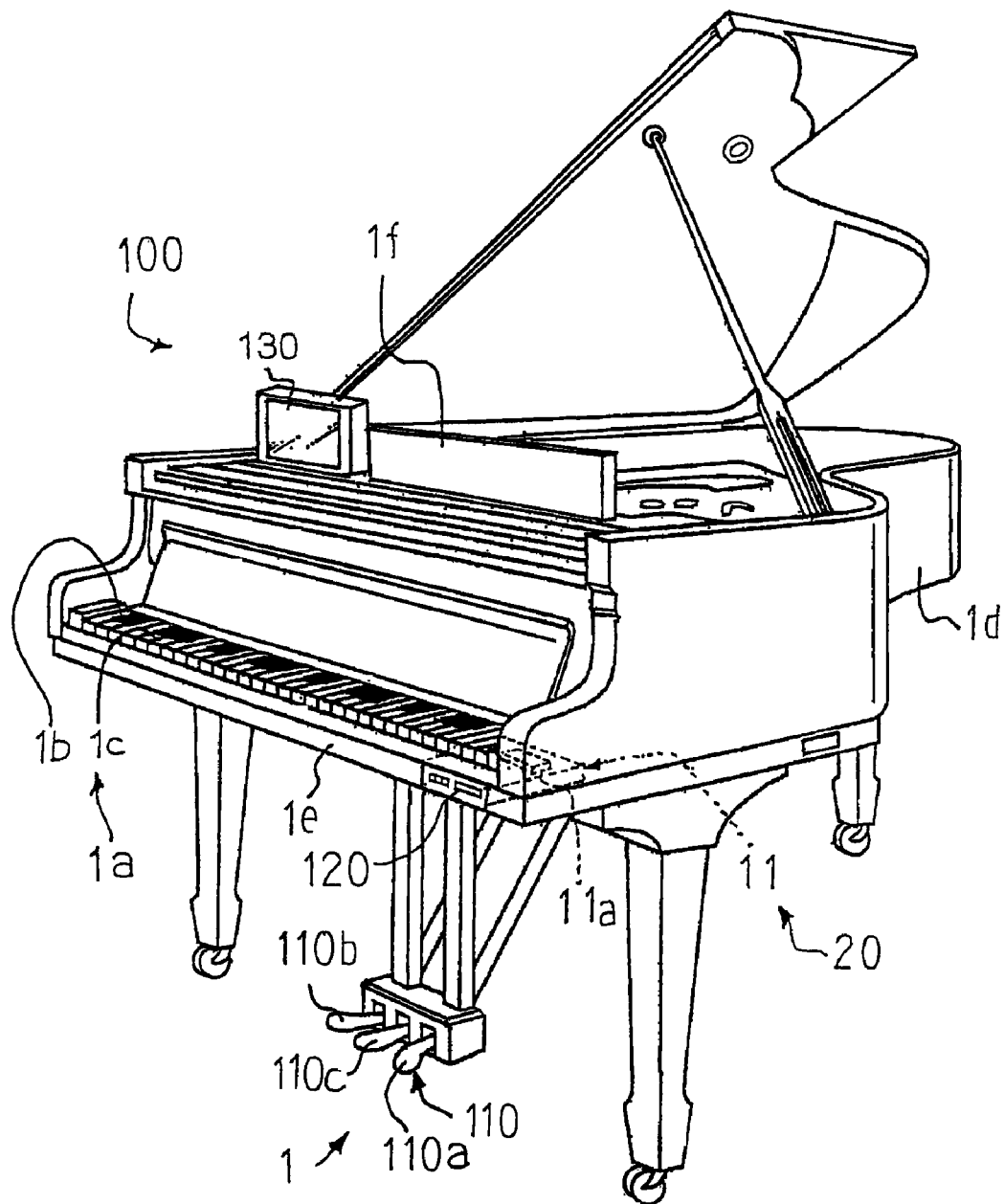
FIG. 1 is a schematic perspective view showing the external appearance of an automatic player piano equipped with a built-in electronic proof system of the present invention.

An electronic proof system embodying the present invention is per se provided to users. Otherwise, the electronic proof system is installed in a musical instrument, and the musical instrument with built-in electronic proof system is provided to users. In this situation, description is made on the musical instrument with built-in electronic proof system.

The musical instrument is used for producing music sound, and comprises at least one manipulator, a tone generator and the electronic proof system. The at least one manipulator is moved along a trajectory by a player, and an attribute of music sound is changed through the movement of at least one manipulator. The attribute of music sound is, by way of example, loudness, pitch, timbre and time period over which the music sound is sustained. The music sound is produced through the tone generator, and the at least one manipulator is connected to the tone generator so as to change the attribute of music sound.

The electronic proof system is provided for giving a notice of incorrect manipulation on the at least one manipulator to the player. The electronic proof system includes a data storage, a detector, an actuator and a controller. Pieces of music data are stored in the data storage, and express the amount of target variation of the at least one manipulator. The at least one manipulator is monitored with the detector, and pieces of detected data are produced through the detector. The pieces of detected data express the amount of actual variation of the at least one manipulator. The actuator is provided for the at least one manipulator, and is responsive to a driving signal so as to move the at least one manipulator. The controller is connected to the data storage, the detector and the actuator. For this reason, the pieces of music data and pieces of detected data are supplied from the data storage and detector, respectively, and the driving signal is supplied to the actuator. The controller has a data processing capability so as to drive the at least one manipulator by means of the actuator.

In detail, the controller compares the amount of target variation with the amount of actual variation to see whether or not the manipulator is properly manipulated. If the player properly manipulates the at least one manipulator, a difference between the target variation and the actual variation is less than a certain amount, and the controller does not drive the at least one manipulator by means of the actuator. However, if the difference is equal to or greater than the certain amount, the controller supplies the driving signal to the actuator. Then, the at least one manipulator is driven by the actuator so as to give the notice through a tactile impression to the player.

Thus, the electronic proof system embodying the present invention makes the player notice the improper manipulation through the tactile impression of player.

In the following description, term "front" is indicative of a position closer to a human player, who is sitting on a stool for fingering, than a position modified with term "rear". "Longitudinal direction" extends in a direction passing through a front position and a corresponding rear position, and "lateral direction" crosses the longitudinal direction at right angle. "Up-and-down direction" is normal to a plane defined by the longitudinal direction and lateral direction.

First Embodiment

Figure 2:
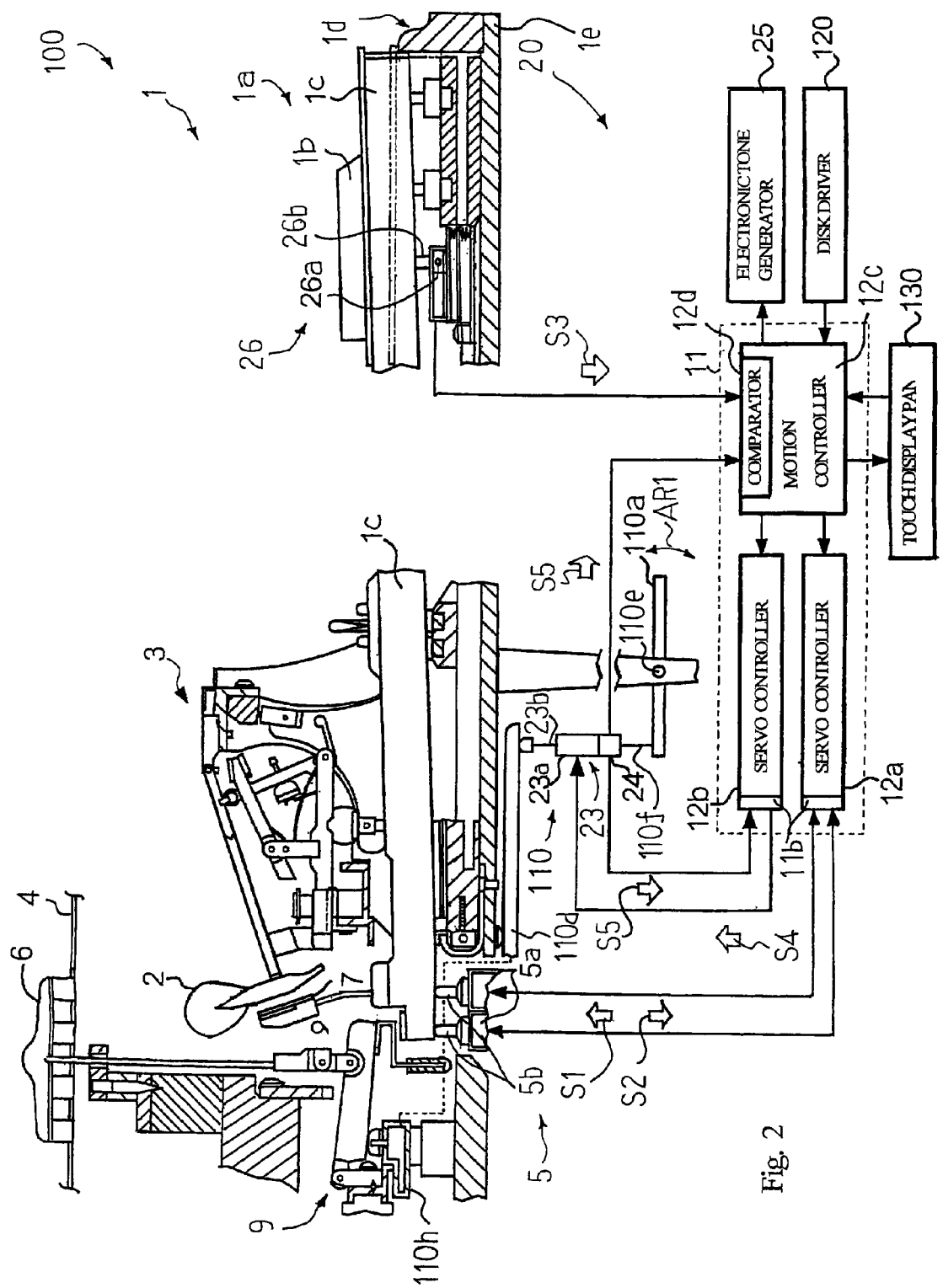
FIG. 2 is a schematic side view showing the structure of the automatic player piano.

Referring first to FIGS. 1 and 2 of the drawings, reference numeral 100 designates an automatic player piano embodiment the present invention. The automatic player piano 100 largely comprises an acoustic piano 1, a muting system (not shown) and an electric system 20, and the electric system is installed in the acoustic piano 1. The electric system 20 has information processing capability so as to serve as an automatic playing system and an electronic proof system through execution of sub-routine programs. In detail, while the sub-routine program for the automatic playing is running, the electric system 20 serves as the automatic playing system, and the automatic playing system performs a music tune on the acoustic piano 1 without any fingering of a human player. On the other hand, while the subroutine program for the electronic proof is running, the electric system 20 serves as the electronic proof system, and notifies a human player, who is playing a music tune on the acoustic piano 1, of incorrect pedaling.

Though not shown in the drawings, the muting system includes a hammer stopper and a driving mechanism for the hammer stopper. While the hammer stopper is being active, the hammer stopper prohibits the acoustic piano 1 from producing acoustic piano tones, and the electric system 20 produces electronic tones instead of the acoustic tones.

Acoustic Piano

The acoustic piano 1 includes a keyboard 1a, i.e., an array of black keys 1b and white keys 1c, hammers 2, action units 3, strings 4, damper units 9, a pedal mechanism 110 and a piano cabinet 1d. The keyboard 1a is mounted on a key bed 1e, which forms a bottom part of the piano cabinet 1d, and the hammers 2, action units 3, strings 4 and damper units 9 are provided inside the piano cabinet 1d.

The black keys 1b and white keys 1c are arrayed in the lateral direction, and are linked with the action units 3 at the intermediate portions thereof and damper units 9 at the rear portions thereof. While force is being exerted on the front portions of keys 1b and 1c, the black keys 1b and white keys 1c travel from rest positions to end positions along respective loci, and the black keys 1b and white keys 1c actuate the associated action units 3.

The action units 3 are further linked with the hammers 2, and the hammers are rotatable. For this reason, the movements of keys 1b and 1c are transmitted through the action units 3 to the hammers 2, and give rise to rotation of the hammers 2. The hammers 2 are opposed to the strings 4, and give rise to vibrations of the strings 4 at the end of rotation. A human player and the automatic playing system drive the hammers 2 for the rotation by depressing and releasing the black keys 1b and white keys 1c. A back check 7 forms a part of the action unit 3, and makes the hammers 2 softly landed thereon.

The hammer stopper (not shown) is provided between the hammers 2 and the strings 4. While driving mechanism (not shown) is keeping the hammer stopper outside the loci of keys 1b and 1c, the hammer stopper does not interfere the movements of keys 1b and 1c. However, when a human player moves the hammer stopper onto the loci of keys 1b and 1c by means of the driving mechanism, although the action units 3 make the hammers 2 driving for rotation, the hammers 2 rebound on the hammer stopper before reaching the strings 4. Thus, the muting system prevents the strings 4 from vibrations at the collision with the hammers 2.

The damper units 9 have respective dampers 6, and the depressed black keys 1b and depressed white keys 1c make the associated dampers 6 spaced from and brought into contact with the strings 4 depending upon the key positions on the loci of keys 1b/1c. While the dampers 6 are held in contact with the strings 4, the strings 4 are prohibited from the vibrations. However, when the dampers 6 are spaced from the strings 4, the strings 4 are permitted to vibrate.

The pedal mechanism 110 includes three pedals, i.e., a damper pedal 110a, a soft pedal 110b and a sostenuto pedal 110c and linkwork 110d. The linkwork 110d includes three series combinations of links, and the three series of links are respectively associated with the damper pedal 110a, soft pedal 110b and sostenuto pedal 110c. When the damper pedal 110a is depressed, the tones are prolonged. When the soft pedal 110b is depressed, the tones are reduced in loudness. When the sostenuto pedal 110c is depressed, the tone is prolonged.

The damper pedal 110a, sostenuto pedal 110c and soft pedal 110b are connected to the damper units 9 and keyboard 1a through the linkwork 110d so that a human player and automatic playing system selectively impart the effects to the tones or tone. The soft pedal 110b and associated series of links of linkwork 110d and the sostenuto pedal 110c and associated series of links of linkwork 110d are similar to the damper pedal 110a and associated series of links of linkwork 110d. For this reason, description is made on the damper pedal 110a and associated linkwork 110d for the sake of simplicity.

The damper pedal 110a is rotatable about a pin 110e as indicated by arrows AR1. A human player steps on the front portion of damper pedal 110a so as to prolong the tones. Though not shown in the drawings, a pedal spring is provided under the front portion of the damper pedal 110a, and upwardly urges the damper pedal 110a. While the human player is not exerting foot force on the front portion of damper pedal 110a, the pedal spring keeps the damper pedal at a rest position. On the other hand, when the foot force excesses the elastic force of the pedal spring, the damper pedal 110a starts to rotate in the clockwise direction in FIG. 2. The damper pedal reaches an end position at the end of rotation.

The series of links of linkwork 110d is connected to the rear portion of the damper pedal 110a, and a solenoid-operated pedal actuator 23 and a pedal position sensor 24 are inserted in the series of links of linkwork 110d. The first link and last link are called as a pedal rod 110f and a lifting rail 110h, respectively. The pedal rod 110f is connected to the rear portion of damper pedal 110a, and the lifting rail 110h extends in the lateral direction under the damper units 9. While the front portion of damper pedal 110a is traveling from the rest position toward the end position, the pedal rod 110f is moved upwardly, and the lifting rail 110h gives rise to the upward movements of the damper units 9. While the damper pedal 110a is staying at the rest position, the dampers 6 exert their weight on the associated strings 4. Even when the lifting rail 110h starts to push up the damper units 9, the dampers 6 still exert their weight on the strings 4 due to the play in the damper units 9. When the play is consumed, the dampers 6 are gradually moved upwardly, and start to be spaced from the strings 4.

On the other hand, when the foot force is removed from the front portion of damper pedal 110a, the damper pedal 110a returns to the rest position, and the weight of dampers 6 makes themselves brought into contact with the strings 4, again.

The pedal position sensors 24 are of the type having plural photo couplers provided along the locus of plunger 23b and a photo-shielding plate connected to the plunger 23b. While the plunger 23b is moving in the downward direction, the light beams are successively interrupted with the photo-shielding plate. As a result, the total amount of photo-current output from the photo-couplers is reduced. Thus, the current plunger position, which is equivalent to the current pedal position, is correlated with the total amount of photo-current.

Description is hereinafter made on relation between the pedal stroke of damper pedal 110a and the pedal effects. As described hereinbefore, when the damper pedal 110a reaches the end position, the dampers 6 are perfectly spaced from the strings 4, and permit the strings freely to vibrate. Even through the black keys 1b and white keys 1c are released, the damper pedal 110a and linkwork 110d keep the dampers 6 perfectly spaced from the strings 4. For this reason, the string or strings 4, which are struck with the hammers 2, continue to vibrate so as to prolong the tones, and other strings 4 are excited through the resonance with the vibrations of struck string or strings 4. These pedal effects are hereinafter referred to as "full-stroke pedal effect".

While the damper pedal 110a is moving toward the rest position, the dampers 6 are lightly touched with the strings 4, and the vibrations of strings 4 are gradually damped with the dampers 6. When the dampers 6 exert their full weight on the strings 4, the dampers 6 are perfectly held into contact with the strings 6, and do not permit the strings 4 to vibrate any more. If the dampers 6 are maintained at a certain position between the lightly touched position and the perfectly contact position, the tones are slightly prolonged, and the loudness is reduced. These pedal effects are referred to as "half-pedal effect". Professional pianists can intentionally impart the half-pedal effect to the tones as well as the full-stroke pedal effect by exactly controlling the stroke of damper pedal 110a.

A human player performs a music tune on the acoustic piano 1 as follows. While all of the black and white keys 1b/1c are staying at the rest positions, the hammers 2 are spaced from the associated strings 4, and the dampers 6 are held in contact with the strings 4 as shown in FIG. 2. When the human player starts his or her performance, he or she selectively depresses the black keys 1b and white keys 1c, and steps on the pedals 110a to 110c for his or her artificial expression.

When the human player depresses one of the black and white keys 1b/1c, the depressed key 1b/1c starts to travel on the locus. While the depressed key 1b/1c is traveling on the locus toward the end position, the depressed key 1b/1c causes the dampers 6 to be spaced from the associated strings 4, and the dampers 6 permit the strings 6 to vibrate. The depressed key 1b/1c further actuates the associated action unit 3. The actuated action unit 3 makes the hammer 2 driven for rotation toward the associated string 4. The hammer 2 is brought into collision with the string 4 at the end of rotation, and gives rise to vibrations of the string 4. The vibrating string 4 in turn gives rise to the vibrations of a sound board, which forms a part of the piano cabinet 1d, and an acoustic piano tone is radiated from the acoustic piano 1. The hammer 2 rebounds on the string 4, and is softly landed on the back check 7.

The loudness of acoustic piano tone is proportional to the velocity of hammer 2 immediately before the collision with the string 4. The human player strongly depresses the black keys 1b and white keys 1c so as to produce the acoustic piano tones at large loudness. On the other hand, the human player gently depresses the black keys 1b and white keys 1c for the acoustic piano tones at small loudness.

When the human player releases the depressed key 1b/1c, the released key 1b/1c starts backwardly to travel on the locus. The released key 1b/1c permits the damper 6 to move toward the string 4, and is brought into contact with the vibrating string 4 so as to decay the vibrations. The released key 1b/1c further permits the action unit 3 to return to the rest position shown in FIG. 2.

When the human player wishes to give the artificial expression to the acoustic piano tones, the human player depresses the pedal 110a/110b/110c of the pedal mechanism 110, and makes the acoustic piano tone prolonged or lessened in loudness depending upon the depressed pedal 110a/110b/110c.

Electric System

The solenoid-operated pedal actuators 23 and pedal position sensors 24 form parts of the electronic system 20, and the electric system 20 further includes an array of solenoid-operated key actuators 5, a controller 11, an electronic tone generator 25, an array of key position sensors 26, a disk driving unit 120 and a touch display panel 130. The controller 11 has an information processing system 11a (see FIG. 1) and pulse width modulators 11b (see FIG. 2), and a central processing unit, peripheral processors, a program memory, a working memory, timers, a quartz oscillator, frequency demultipliers, a shared bus system and various interfaces are incorporated in the information processing system 11a. The information processing system 11a is the origin of the data processing capability. A read only memory and/or an electrically erasable and programmable read only memory is available for the program memory, and a random access memory may serve as the working memory. The quartz oscillator supplies a periodic signal to the frequency demultipliers, and clock signals are output from the frequency demultipliers. One of the clock signals is supplied to the timers, and lapses of time are measured by means of the timers.

A computer program is stored in the program memory together with control parameters, and is broken down into a main routine program and sub-routine programs. While the main routine program is running on the central processing unit, human players communicate with the information processing system 11a. The information processing system 11a produces visual images expressing a job menu and prompt messages on the touch display panel 130, and the human players give their instructions to the information processing system 11a by touching an area or areas of touch display panel 130 where the visual image or images are produced. The information processing system 11a lets the human player know current status of the electric system 20 through the touch display panel 130. One of the sub-routine programs is prepared for the automatic playing, and another sub-routine program is prepared for the electronic proof.

The electronic tones are produced through execution of yet another subroutine program. While a human player is playing a music tune on the acoustic piano 1, the key position sensors 26 and pedal position sensors 24 monitor the keys 1b/1c and pedals 110a/110b/110c, and notify the movements of keys 1b/1c and movements of pedals 110a/110b/110c through pieces of key position data and pieces of pedal position data. The information processing system 11a analyzes the pieces of key position data and pieces of pedal position data, and produces a set of music data codes expressing tones to be produced and effect to be imparted to the tones. The music data codes are supplied to the electronic tone generator 25 so as to produce the electronic tones in real time fashion.

When the human player instructs the electric system 20 to perform a music tune without any fingering, i.e., through the automatic playing, the main routine program starts periodically to branch to the subroutine program for the automatic playing. On the other hand, if the human player instructs the electric system 20 to check the pedals 110a, 110b and 110c to see whether or not he or she correctly imparts the pedal effects to the tones during the performance on the acoustic piano 1, the main routine program starts periodically to branch to the subroutine program for the electronic proof.

Servo controllers 12a and 12b, a motion controller 12c and a comparator 12d express functions of controller 11 which are realized through the execution of subroutine program for the automatic playing and the execution of subroutine program for the electronic proof. The servo controller 12a is assigned to the solenoid-operated key actuators 5, and the other servo controller 12b is assigned to the solenoid-operated pedal actuators 23. The functions will be described in conjunction of the behavior of automatic player piano 100.

The array of solenoid-operated key actuators 5 are provided in association with the black keys 1b and white keys 1c, and are supported by the key bed 1e under the rear portions of black keys 1b and the rear portions of white keys 1c. Each of the solenoid-operated key actuators 5 has a solenoid 5a, a plunger 5b and a built-in plunger velocity sensor (not shown). The solenoids 5a are connected in parallel to the pulse width modulators 11b so that the pulse width modulators 11b selectively supply driving signals S1 to the solenoid. The plungers 5b are projectable from and retractable into the associated solenoids 5a, and the tips of plungers 5b are staying beneath the lower surfaces of keys 1b and 1c while the plungers 5b are retracted in the solenoids 5a. The built-in plunger sensors (not shown) monitor the plungers 5b, and supply plunger velocity signals S2 to the servo controller 12a for the servo control on the solenoid-operated key actuators 5.

While the driving signal S1 is following through the solenoid 5a, magnetic field is created around the plunger 5b, and the magnetic force makes the plunger 5b upwardly project from the solenoid 5a. As a result, the plunger 5b pushes the rear portion of the associated key 1b or 1c, and the black key 1b or white key 1c is moved without any fingering of a human player. The magnetic force is proportional to the mean current or duty ratio of the driving signal S1, and the information processing system 11a makes the pulse width modulator 11b vary the amount of mean current depending upon the loudness of tone to be produced.

When the driving signal S1 is removed from the solenoid 5a, the weight of key 1b/1c, action unit 3, hammer 2 and damper 6 presses the plunger 5b in the downward direction. As a result, the plunger 5b is retracted into the associated solenoid 5a.

The array of key position sensors 26 is provided under the front portions of black keys 1b and the front portions of white keys 1c. The key sensors 26 are of the type converting the current key position to the amount of photo current. In detail, each of the key sensors 26 has a pair of sensor heads 26a connected to a light emitting diode and a light detecting element and an optical modulator 26b. The sensor heads 26a are provided on both sides of the locus of associated key 1b or 1c, and a light beam is created across the locus. The optical modulator 26b is secured to the associated key 1b or 1c in such a manner as downwardly to project from the lower surface of key 1b or 1c. The transparency of optical modulator 26b is varied from the upper end to the lower end. While the associated black key 1b or white key 1c is traveling on the locus, the light beam passes through the optical modulator 26b, and the optical modulator 26b varies the amount of light passing therethrough depending on the current key position on the locus. The light detecting element converts the incident light to photo current, and the photo current forms a key position signal S3. The key position signals S3 express the pieces of performance data, and are supplied from the key sensors 26 to the controller 11.

The solenoid-operated pedal actuators 23 are associated with the three pedals 110a, 110b and 110c, respectively, and are inserted in the series of links of linkwork 110d, respectively. Each of the solenoid-operated pedal actuators 23 has a solenoid 23a and a plunger 23b. The plunger 23b is connected between the pedal rod 110f and the next link, and is moved in the upward direction in the magnetic field created by the solenoid 23a.

The pulse width modulator 12b is connected to the solenoids 23a, and a driving signal S4 is selectively supplied from the pulse width modulator 12b to the solenoids 23a. While the driving signal S4 is flowing through the solenoid 23a, magnetic field is created, and magnetic force is exerted on the plunger 23b so as to make the plunger upwardly moved. The pedal sensors 24 monitor the plungers 23b, and each of the pedal sensors 24 produces a pedal position signal S5. The pedal position signal S5 is indicative of the current position of plunger 23b and, accordingly, current pedal position of the associated pedal 110a/110b/110c. The pedal position signals S5 are further supplied to the comparator 12d, and pieces of music data, which express target pedal positions of pedals 110a/110b/110c, are supplied to the working memory to the comparator 12d.

A piece of music data is assumed to express the pedal stroke of damper pedal 110a for the full-stroke pedal effect or half pedal effect. The current pedal position is compared with the target pedal position to see whether or not the human player depresses the damper pedal 110a to the target pedal position. When the human player brings the damper pedal 110a into target pedal position, the controller 11 continues to monitor the damper pedal 110a without any notice. However, if the human player unintentionally brings the damper pedal 110a to another pedal position spaced from the target pedal position, the answer of comparator 12d is given negative. Then, the motion controller 12c determines a reference pedal trajectory for the damper pedal 110a, and periodically supplies pieces of pedal data expressing the reference pedal trajectory to the servo controller 12b. The reference pedal trajectory makes the damper pedal 110a vibrate in a narrow range so that the human player notifies the damper pedal 110a staying at an incorrect pedal position spaced from the target pedal position.

The electronic tone generator 25 includes a waveform memory, data read-out modules and a sound system, and a headphone is incorporated in the sound system together with amplifiers and loudspeakers. When a key event data code arrives at the electronic tone generator 25, the note number and loudness of tone to be produced are determined on the basis of the key event data code. When the time period from the previous key event is expired, the data read-out module starts to read out pieces of waveform data expressing the waveform of an audio signal from the waveform memory. The pieces of waveform data are formed into the audio signal, and the audio signal is supplied through the amplifiers to the loudspeakers or headphone.

The touch panel display unit 130 is a combination of a liquid crystal display panel and a matrix switch overlapped with the monitor screen of the liquid crystal display panel. The touch panel display unit 130 is provided on the piano cabinet 1d on the left side of a music rack 1f so that a human player can give his or her instruction to the electric system 20 by pushing areas of the matrix switch over certain visual images produced on the monitor screen of the liquid crystal display panel without standing up. As described hereinbefore, the information processing system 11a produces visual images expressing the job menu, prompt messages, confirmation messages and current status of the electric system 20 on the touch panel display unit 130. Thus, the touch panel display unit 130 serves as a man-machine interface.

The key bed 1e is partially cut out so as to form a hollow space, and the controller 11 is inserted into the hollow space. The housing of controller 11 has a front panel, which is coplanar with the front surface of the key bed 1e, and the disk driving unit 120 is exposed to the human player, who is sitting on a stool for fingering. For this reason, while a disk tray is staying at state projecting from the front panel of the housing of controller 11, the human player puts an information disk such as, for example, a CD (Compact Disc) or a DVD (Digital Versatile Disc) on the disk tray. Thereafter, the human player retracts the disk tray into the housing of controller 11.

Plural sets of music data codes express music tunes, and are stored in the information disk. When the disk tray is retracted, the disk driving unit 120 gets ready to read out any one of the plural sets of music data codes from the information disk. When a user specifies a music tune, the disk driving unit 120 transfers the set of music data expressing the music tune from the information disk to the working memory. In this instance, the formats of music data codes are defined in MIDI (Musical Instrument Digital Interface) protocols.

Figure 3:
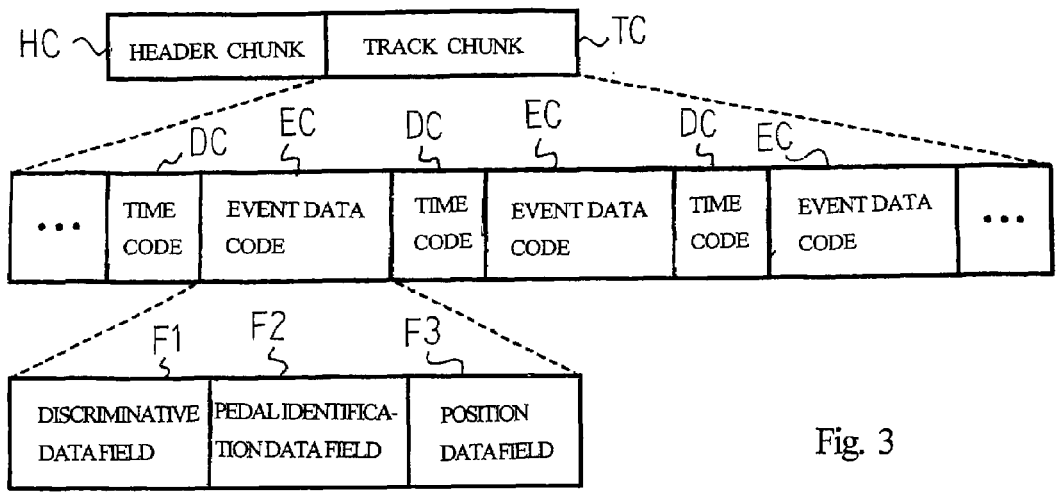
FIG. 3 is a view showing the data fields of a standard MIDI file.

FIG. 3 shows the data fields of a standard MIDI file. The standard MIDI file is broken down into a header chunk HC and a track chunk TC, and time codes DC and event data codes EC are stored in the track chunk TC. Pieces of attribute data express the attributes of standard MIDI file such as the title of music tune, and are stored in the header chunk HC. Each of the time codes DC expresses a lapse of time between an event and the next event, and the total sum of values of time codes is equivalent to the lapse of time from the data processing on the first event data code. In other words, the lapse of time from the initiation of playback is expressed by the total sum of values of time codes DC. When the lapse of time, which is expressed by the time code DC, is expired, the next event or next events are to take place. The time at which the event takes place is referred to as "event time".

The event data codes EC, by way of example, express the voice messages such as, for example, key event messages, i.e., note-on key event messages and note-off key event messages and control change messages. Some control change messages are used for the pedal effects, and are referred to as "pedal event messages". The event data codes, which express the pedal event messages, are referred to as "pedal event data codes". The pedal event data codes includes a discriminative data field F1, a pedal identification data field F2 and a position data field F3. The discriminative data field F1 expresses that the event data code EC is categorized in the pedal event data code. The pedal identification data field F2 expresses the damper pedal 110a, soft pedal 110b or sostenuto pedal 110c, and the position data field F3 expresses the pedal stroke from the rest position, i.e., the target pedal position on the locus.

Behavior of Automatic Player Musical Instrument

A user is assumed to instruct the electric system 20 to reenact a performance on an acoustic piano. The central processing unit of information processing system 11a makes the peripheral processor to transfer the pieces of music data expressing the titles of music tunes from the information disk to the working memory, and further makes another peripheral processor to produce the visual images of a list of titles on the touch display panel 130. When the user selects a music tune from the list, the automatic playing system gets ready to perform the music tune on the acoustic piano 1.

The main routine program periodically branches to the subroutine program for the automatic playing. The central processing unit accumulates the values of time data codes DC so as to measure the lapse of time from the initiation of performance, and sequentially processes the event data codes EC at the event time through the execution of subroutine program for the automatic playing.

An event data code, which expresses the note-on key event for a white key 1c, is assumed to be processed in the performance. The motion controller 12c analyzes the piece of event data stored in the note-on key event data code, and determines a reference forward key trajectory. The reference forward key trajectory is a series of values of target key position varied together with time. If the white key 1c travels on the reference forward key trajectory, the hammer 2 is brought into collision with the string 4 at a target time at which the acoustic piano tone is to be produced, and the acoustic piano tone is generated through the vibrations of string 4 at a target value of loudness. The values of target key position are periodically supplied from the motion controller 12c to the servo controller 12a.

The built-in plunger velocity sensors (not shown) supply the plunger velocity signals S2 indicative of the current plunger velocity, which is equivalent to the current key velocity, to the servo controller 12a. The servo controller 12a calculates a value of target key velocity from a series of values of target key position, and further calculates a value of current key position from the series of values of current key velocity. The servo-controller 12a compares the value of target key position and value of target key velocity with the value of current key position and value of current key velocity so as to determine the difference between the target key position and the current key position and the difference between the target key velocity and the current key velocity. The servo controller 12a increases or decreases a target value of mean current of the driving signal S1 in such a manner as to minimize the difference of key position and difference of key velocity, and the pulse with modulator 11b adjusts the driving signal S1 to the target value of means current. The above-described jobs are periodically repeated for the white key 1c. Thus, the solenoid-operated actuators 5, built-in plunger sensors (not shown), servo controller 12a and pulse-width modulator 11b form a servo control loop, and the black keys 1b and white keys 1c are forced to travel on the reference forward key trajectories through the servo control loop.

The time to process the note-off key event data code is assumed to come for the white key 1b. The motion controller 12c determines a reference backward key trajectory on the basis of the piece of note-off event data. The reference backward key trajectory is a series of values of target key position toward the rest position. If the white key 1c travels on the reference backward key trajectory, the released white key 1c permits the damper 6 to be brought into contact with the vibrating string 4 at the time to make the note-off event occur, and the acoustic piano tone is decayed. The values of target key position are periodically supplied from the motion controller 1c to the servo controller 12a, and the servo controller 12a forces the released white key 1c to travel on the reference backward key trajectory.

The time to process a pedal event data code is assumed to come for the damper pedal 110a. The motion controller 12c determines a reference pedal trajectory on the basis of the piece of pedal event data. The reference pedal trajectory is a series of values of target pedal position. If the damper pedal 110a travels on the reference pedal trajectory, the full-stroke pedal effect or half-pedal effect is imparted to the tone or tones at the event time.

The values of target pedal position are periodically supplied from the motion controller 12c to the servo controller 12b. The pedal position sensor 24 monitors the plunger 23b of the solenoid-operated pedal actuator 23, and supplies the pedal position signal S5 indicative of the current pedal position to the servo controller 12b. The servo controller 12b calculates a target pedal velocity and a current pedal velocity, and determines the mean current of driving signal S4 in such a manner as to minimize the difference between the target pedal position and the current pedal position and the difference between the target pedal velocity and the current pedal velocity. The pulse width modulator 1b adjusts the driving signal S4 to the value of mean current, and the driving signal S4 is supplied from the pulse width modulator 11b to the solenoid-operated pedal actuator 23 for the damper pedal 110a. The above-described jobs are periodically repeated, and the damper pedal 110a is forced to travel on the reference pedal trajectory.

While the music tune is being reproduced on the basis of the set of music data codes, the above-described control sequences are carried out for all of the black and white keys 20f/20h to be depressed and released and all the pedals 110a, 110b and 110c to be depressed and released. This results in the playback of the music tune.

A user is assumed to instruct the electric system 20 to prove whether or not his or her pedaling is correct. The main routine program starts periodically to branch to the subroutine program for the electronic proof.

Figure 4:
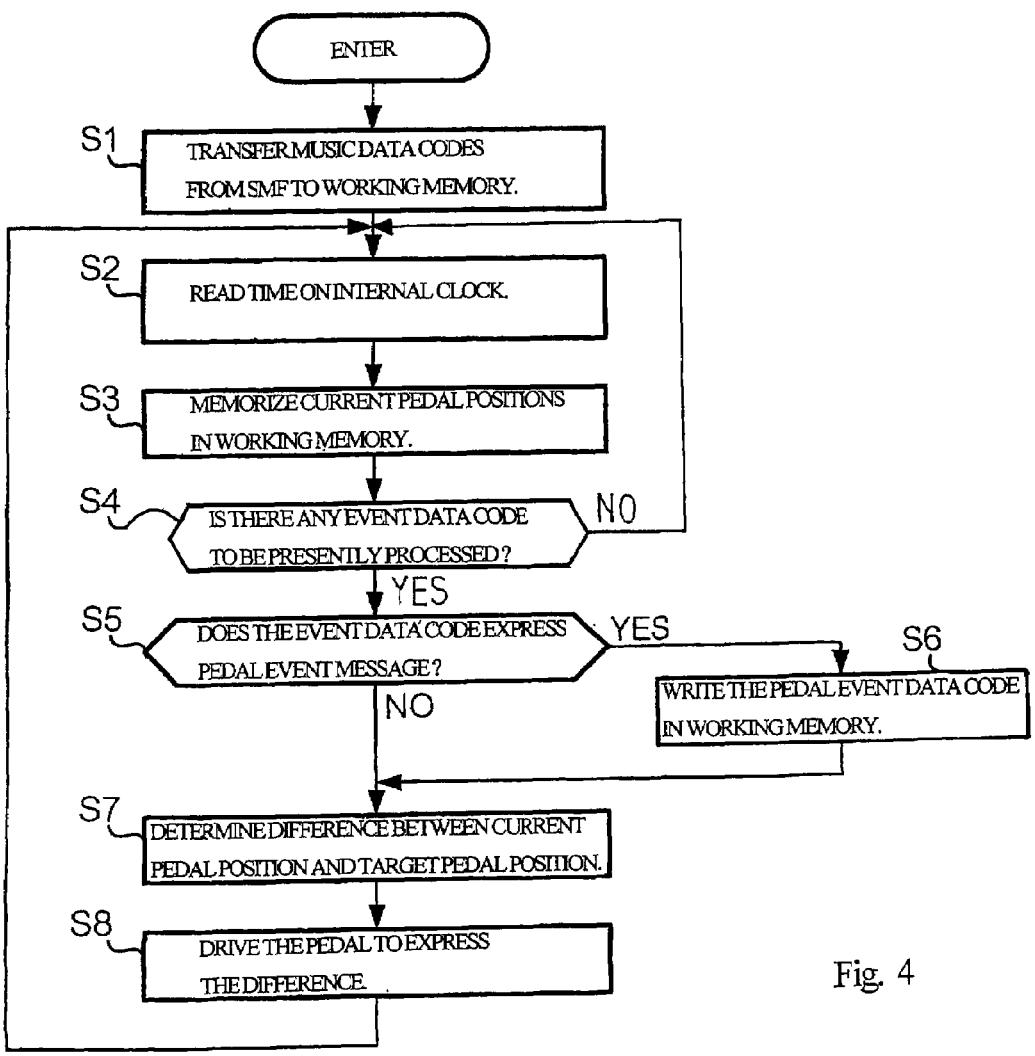
FIG. 4 is a flowchart showing a sequence of jobs in a subroutine program for electronic proof.

FIG. 4 illustrates a sequence of jobs in the subroutine program for the electronic proof. When a human player selects the electronic proof from the job menu on the touch display panel 130, the central processor makes the peripheral processor to produce the list of music tunes on the touch display panel 130. The human player is assumed to select a music tune from the list. Then, the main routine program starts periodically to branch the subroutine program for the electronic proof.

The central processing unit makes the peripheral processor to transfer the music data codes from the standard MIDI file stored in the information disk to the working memory as by step S1, and waits for the initiation of performance on the acoustic piano 1.

The human player starts his or her performance on the acoustic piano 1. The central processing unit reads the time on the internal clock, and stores the piece of time data expressing the present time in the working memory as by step S2. The central processing unit fetches the pieces of pedal position data from the interface assigned to the pedal position sensors 23, and memorizes the current pedal positions in the working memory as by step S3.

Subsequently, the central processing unit searches the working memory to see whether or not there is an event data code to be presently processed as by step S4. The time data codes DC and piece of time data expressing the present time make it possible to give the answer at step S4. If there is not found any event data code to be presently processed, the answer at step S4 is given negative "No", and the central processing unit returns to step S2. Thus, the central processing unit reiterates the loop consisting of steps S2, S3 and S4 until the change of answer at step S4. The central processing unit calculates the lapse of time from the initiation of performance at step S2 after the first execution of the step.

When the central processing unit finds an event data code to be presently processed, the answer at step S4 is changed to affirmative "Yes", and the central processing unit proceeds to step S5. At step S5, the central processing unit checks the read-out event data code to see whether or not the read-out event data code expresses the pedal event message. When the read-out event data code expresses the pedal event message, the answer at step S5 is given positive "Yes".

With the positive answer, the central processing unit writes the piece of pedal data, which is stored in the pedal identification data field F2 and position data field F3, in the working memory as by step S6.

Subsequently, the central processing unit reads out the current pedal position of the pedal expressed in the pedal identification data field F2 from the working memory, and compares the current pedal position with the target pedal position, which is expressed in the position data field F3, so as to determine the difference between the current pedal position and the target pedal position as by step S7. Thus, the controller 11 serves as the comparator 12d as shown in FIG. 2.

If the current pedal position is consistent with the target pedal position, the difference is zero. On the other hand, if the current pedal position is inconsistent with the target pedal position, the difference is a positive value or a negative value.

Subsequently, the central processing unit serves as the motion controller 12c, and determines a reference pedal trajectory. If the difference is zero, the solenoid-operated pedal actuator 23 does not exert any force on the pedal 110a/110b/110c, and the human player feels the resistance against the pedal usual. In other words, any notice is not given to the human player. On the other hand, if the difference has a positive value or a negative value, the reference pedal trajectory is representative of fine vibrations of the pedal 110a/110b/110c. The pieces of target pedal positions are periodically supplied from the motion controller 12c to the servo controller 12b so as to force the damper pedal to travel along the reference pedal trajectory through the servo control loop. Thus, the electronic proof system gives the notice to the human player through the vibrations of pedal 110a/110b/110c in the performance so that the human player notices the pedal 110a/110b/110c staying at incorrect position. As described hereinbefore, the full-stroke pedal effect is different from the half-stroke pedal effect. If the human player depresses the damper pedal 110a too deep for the half-stroke pedal effect, the human player notices the damper pedal staying at an incorrect pedal position spaced from the target pedal position for the half-stroke pedal effect through the electronic proof. On the other hand, if the human player does not make the damper pedal 110a reach the target pedal position for full-stroke pedal effect, the electronic proof system also gives the notice to the human player. As a result, the human player leans the appropriate pedal stroke for the full-stroke pedal effect and half-stroke pedal effect with the assistance of the electronic proof system.

After the execution of job at step S8, the central processing unit returns to step S2. While the central processing unit is reiterating the loop, the human player changes the pedal 110a/110b/110c to the target pedal position, the difference becomes zero at step S7 so that the solenoid-operated pedal actuator 23 does not exert any force on the pedal 110a/110b/100c. As a result, the human player notices the pedal 110a/110b/110c staying at the target pedal position. Thus, the central processing unit drives the pedals 110a/110b/110c so as to express the difference.

When the event data code to be presently processed expresses the key event message, the answer at step S5 is given negative, and the previous pedal event data code is maintained in the working memory without the execution of job at step S6. For this reason, if the human player keeps the pedal 110a/110b/110c at the previous position, the current pedal position is same as that in the previous execution, and the central processing unit finds the difference unchanged at the step S7. As a result, the servo controller 12b continues the previous notice or does not give any notice at step S8. Of course, if the human player changes the pedal position, the central processing unit may stop or newly give the notice depending upon the difference. Thus, the electronic proof system ignores the key event data codes.

Figure 5:
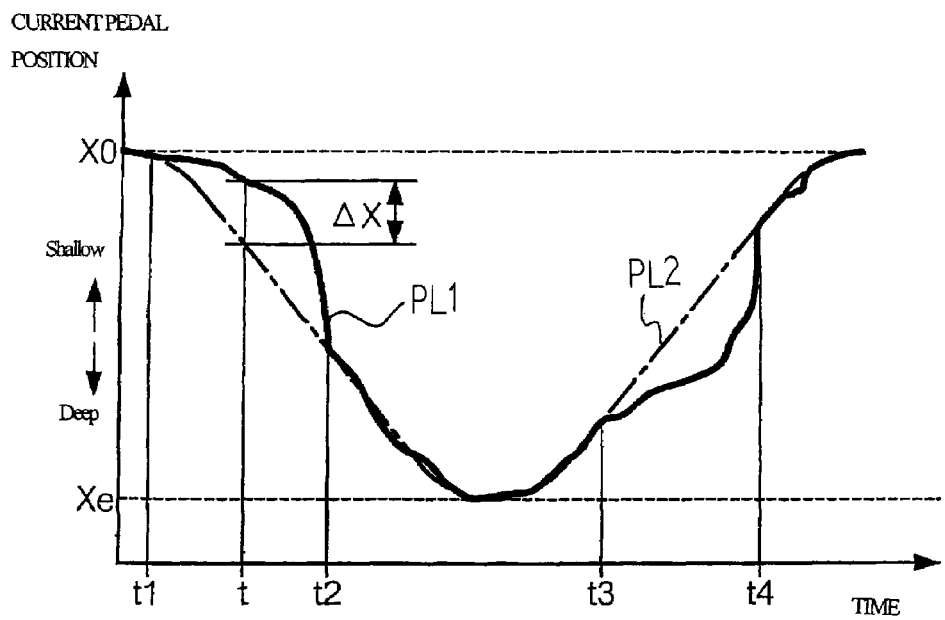
FIG. 5 is a diagram showing a target pedal position and a locus of pedal.

FIG. 5 illustrates a locus PL1 of the pedal 110a/110b/110c expressed by the pedal position signal S5, and a series of values PL2 of target pedal position expressed by the pedal event data codes. X0 expresses the rest position of the pedal 110a/110b/110c, and Xe stands for the end position of pedal 110a/110b/110c.

The human player depresses the pedal 110a/110b/110c to the current pedal position shallower than the target pedal position from time t1 to time t2, and the difference $\Delta X$ takes place. The central processing unit calculates the difference $\Delta X$ at step S7, and multiplies the difference $\Delta X$ by a constant of proportionality. Thus, the product X is obtained. The constant of proportionality is determined in such a manner that the maximum product X is less than the play of damper units 9.

Figure 6:
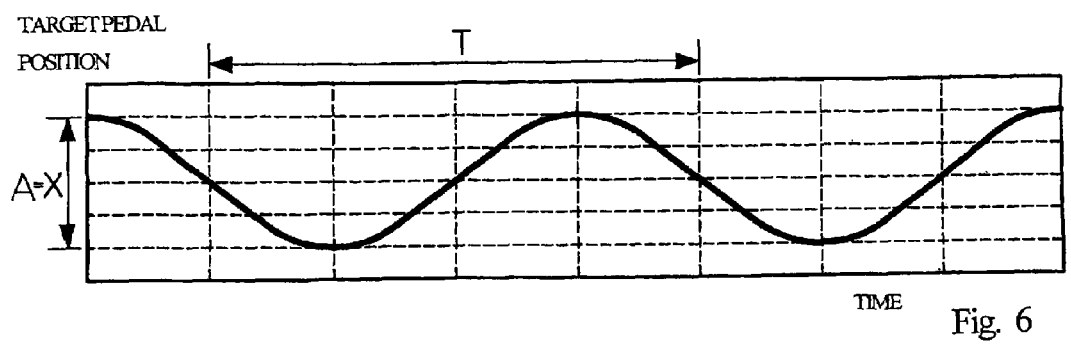
FIG. 6 is a graph showing the waveform of vibrations of a pedal.

The motion controller 12c determines the reference pedal trajectory. In this instance, the reference pedal trajectory makes the pedal 110a/110b/110c along a sine wave, which is varied at regular time intervals of T as shown in FIG. 6, and the amplitude A is equal to the product X. The larger the difference $\Delta X$ is, the wider the amplitude A is. However, the vibrations of pedal 110a/110b/110c do not have any influence on the pedal effect, because the maximum amplitude A is less than the play of damper units 9. The vibrations are taken up by the damper units 9 so that the dampers 6 are not moved. Thus, the electronic proof system makes the human player notice the distance between the target pedal position and the current pedal position through the amplitude of vibrations.

As will be understood from the foregoing description, the electronic proof system of the present invention gives the notice of incorrect pedal position to human players through the movements of pedal so that the human players lean the pedaling with the assistance of the electronic proof system. Even if a human player does not have good ears, the electronic proof system can make the human player notice the pedal staying at incorrect pedal position through the tactile impression of his or her foot.

Second Embodiment

Figure 7:
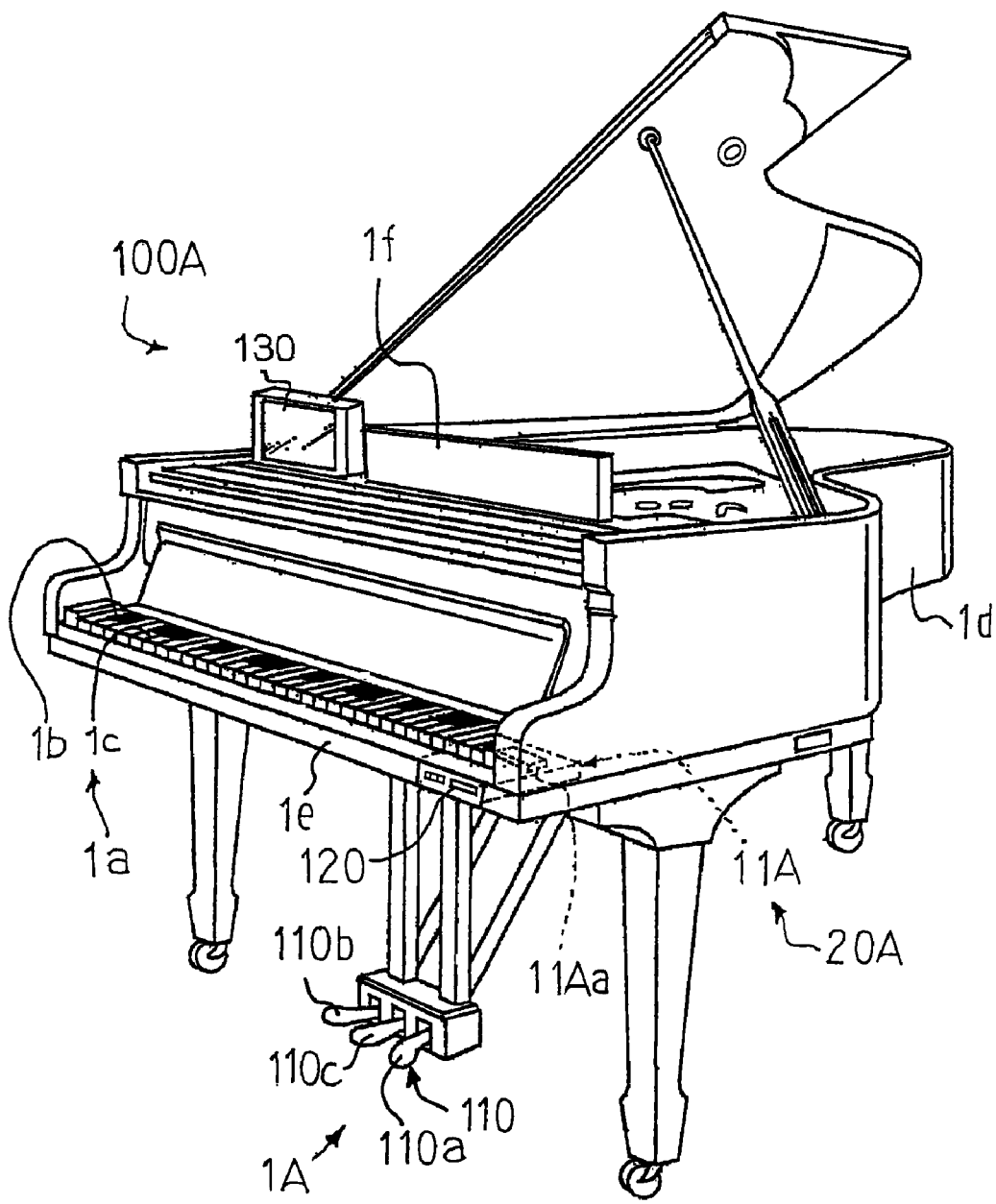
FIG. 7 is a schematic perspective view showing the external appearance of another automatic player piano of the present invention.

Turning to FIG. 7 of the drawings, another automatic player piano 100A embodying the present invention also largely comprises an acoustic piano 1A and an electric system 20A. The acoustic piano 1A is similar in structure to the acoustic piano 1, and component parts of acoustic piano 1A are labeled with references designating the corresponding component parts of acoustic piano 1 without any detailed description for the sake of simplicity.

The electric system 20A is similar in system configuration to the electric system 20 except for the computer software installed in the information processing system 11Aa of a controller 11A. For this reason, description is focused on the computer software.

The computer program in the information processing system 11Aa is also broken down into a main routine program and subroutine programs. The main routine program is same as that installed in the information processing system 11a. Only the subroutine program for electronic proof is different from that installed in the information processing system 11a.

Figure 8:
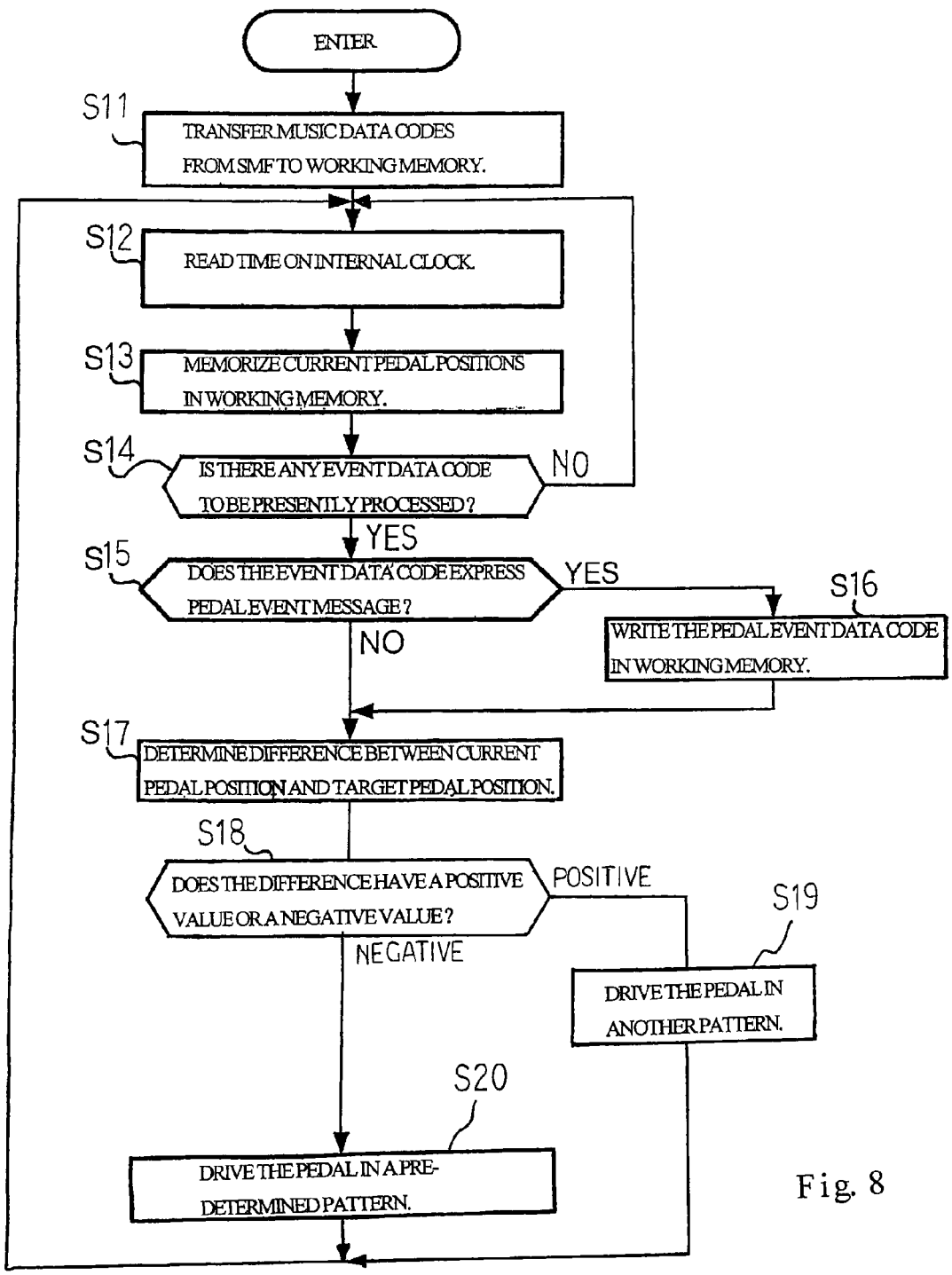
FIG. 8 is a flowchart showing a sequence of jobs in a subroutine program for electronic proof carried out in the automatic player piano.

FIG. 8 illustrates the subroutine program for the electronic proof. The subroutine program for the electronic proof includes jobs at step S11 to S20, and the jobs at step S11 to S17 are same as those at step S1 to S7. However, the jobs at steps S18 to S20 are different from step S8. For this reason, description is focused on the jobs at steps S18 to S20.

FIGS. 9A to 9D show loci of vibrating pedals 110a, 110b and 110c, and the locus shown in FIG. 6 and loci shown in FIGS. 9A to 9D are employable as the reference pedal trajectories. The vibrations shown in FIG. 9A have a square waveform, the vibrations shown in FIG. 9B have a triangle waveform, the vibrations shown in FIGS. 9C and 9D have serrate waveforms. The pieces of pedal trajectory data, which express the waveforms of vibrations, are stored in the working memory of the information processing system 11Aa. The servo controller for the solenoid-operated pedal actuator 23 modulates the amplitude of a control signal, and the servo controller modulates the duty ratio, which is equivalent to the amount of mean current of the driving signal S4, with the modulated control signal.

Figure 9A:
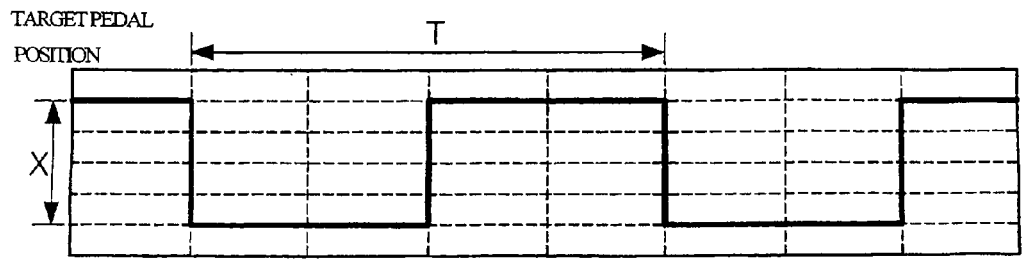
FIGS. 9A to 9D are graphs showing different vibration waveforms.
Figure 9B:
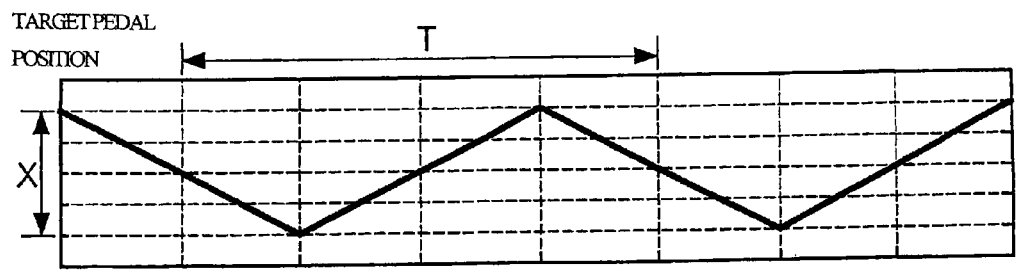
Figure 9C:
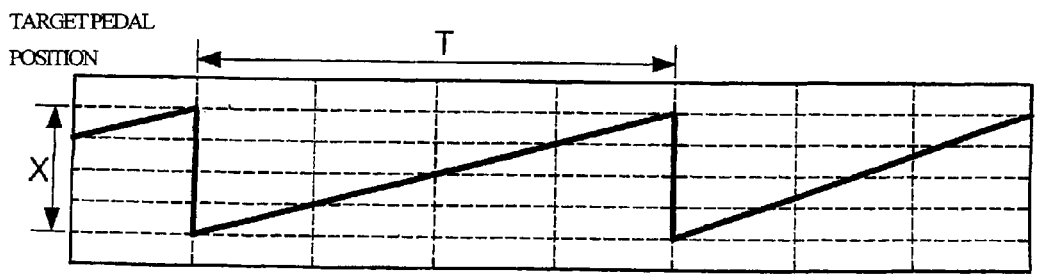

In this instance, the locus shown in FIG. 6 shows default vibration waveform of pedals 110a/110b/110c, the current pedal positions of which are closer to the rest positions than the target pedal positions, and the locus shown in FIG. 9A shows default vibration waveform of pedals 110a/110b/110c, the current pedal positions of which are farther from the rest positions than the target pedal positions. If a user wishes to change these default waveforms to other waveforms shown in FIGS. 9B, 9C and 9D, he or she instructs the information processing system 11Aa to change the default waveform or default waveforms to any one or any ones of the waveforms shown in FIGS. 9B to 9D before initiation of his or her performance.

While the player is performing a music tune on the acoustic piano 1A, the central processing unit periodically enters the subroutine program shown in FIG. 8 through timer interruptions. The central processing unit sequentially executes the jobs at steps S11 to S17, and determines the difference between the current pedal positions and the target pedal positions. When the pedal 110a, 110b or 110c does not reach the target pedal position, the current pedal position is closer to the rest position than the target pedal position, and the difference have a negative value. On the other hand, when the pedal 110a, 110b or 110c runs over the target pedal position, the current pedal position is farther from the rest position than the target pedal position, and the difference have a positive value.

In this situation, the central processing unit checks the difference to see whether the difference has a negative value or a positive value as by step S18. If the difference has a negative value, the central processing unit proceeds to step S20, and gives rise to the vibrations shown in FIG. 6. On the other hand, when the difference has a positive value, the central processing unit proceeds to step S19, and gives rise to the vibrations shown in FIG. 9A.

The electronic proof system informs the player of the amount of difference through the amplitude X, period T, frequency or the ratio between the amplitude X and the period T.

As will be understood from the foregoing description, the electronic proof system gives the player the notice of overrun and the notice of short-stroke through the different vibrating patterns.

Third Embodiment

Figure 10:
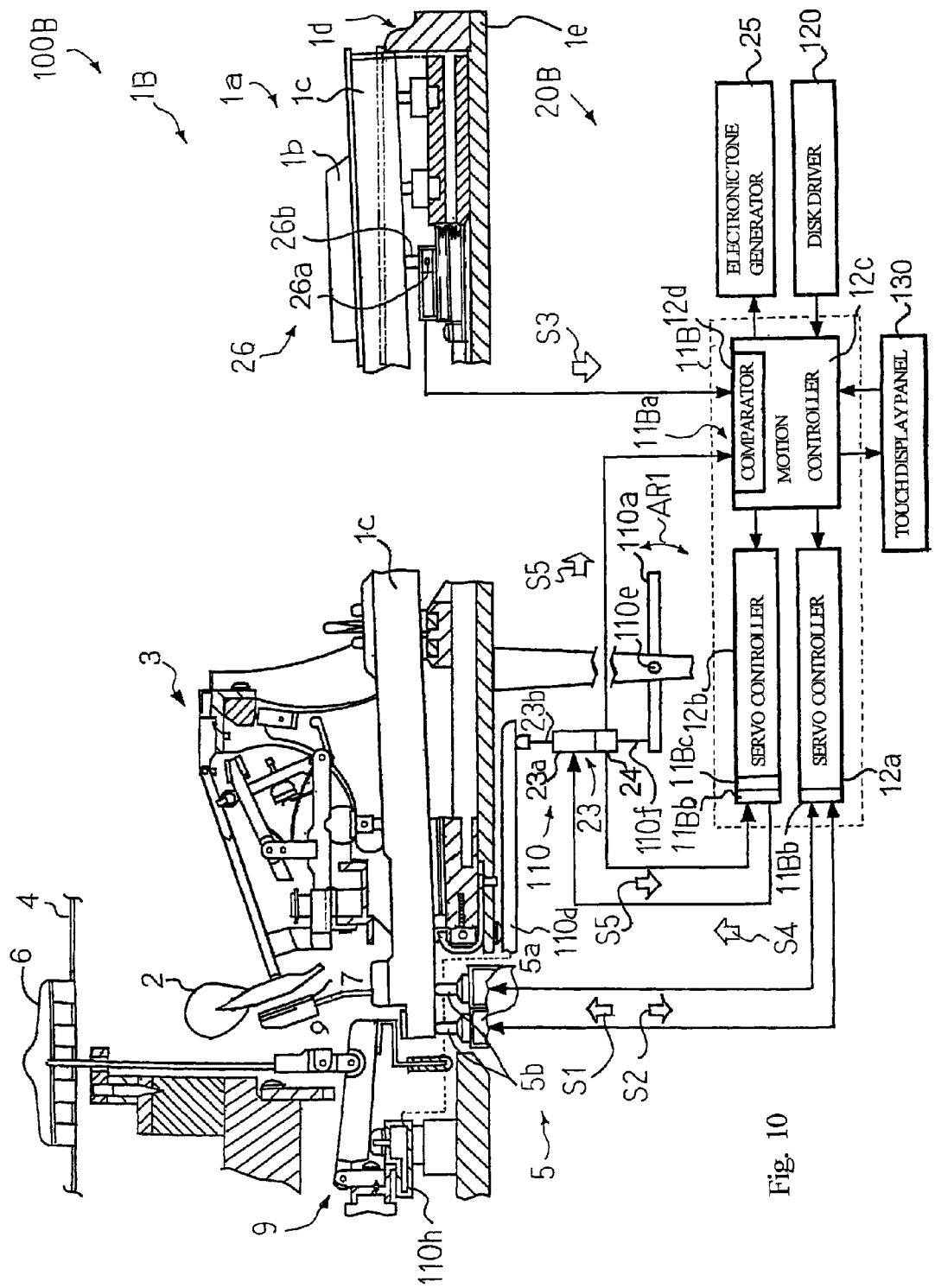
FIG. 10 is a schematic side view showing the structure of yet another automatic player piano of the present invention.

Turning to FIG. 10 of the drawings, yet another automatic player piano 100B embodying the present invention also largely comprises an acoustic piano 1B and an electric system 20B. The acoustic piano 1B is similar in structure to the acoustic piano 1, and, for this reason, component parts of acoustic piano 1B are labeled with references designating the corresponding component parts of acoustic piano 1 without any detailed description for the sake of simplicity.

The electric system 20B is similar in system configuration to the electric system 20 except for pieces of pedal trajectory data. For this reason, description is focused on notices given to players.

The controller 11B includes an information processing system 11Ba, pulse width modulators 11Bb and an amplitude modulation circuit 11Bc. The information processing system 11Ba and pulse width modulators 11Bb are similar in circuit configuration to the information processing system 11a and pulse width modulators 11b, and the amplitude modulation circuit 11Bc is connected between the servo-controller 12b and the pulse width modulator 11Bb.

Figure 11:
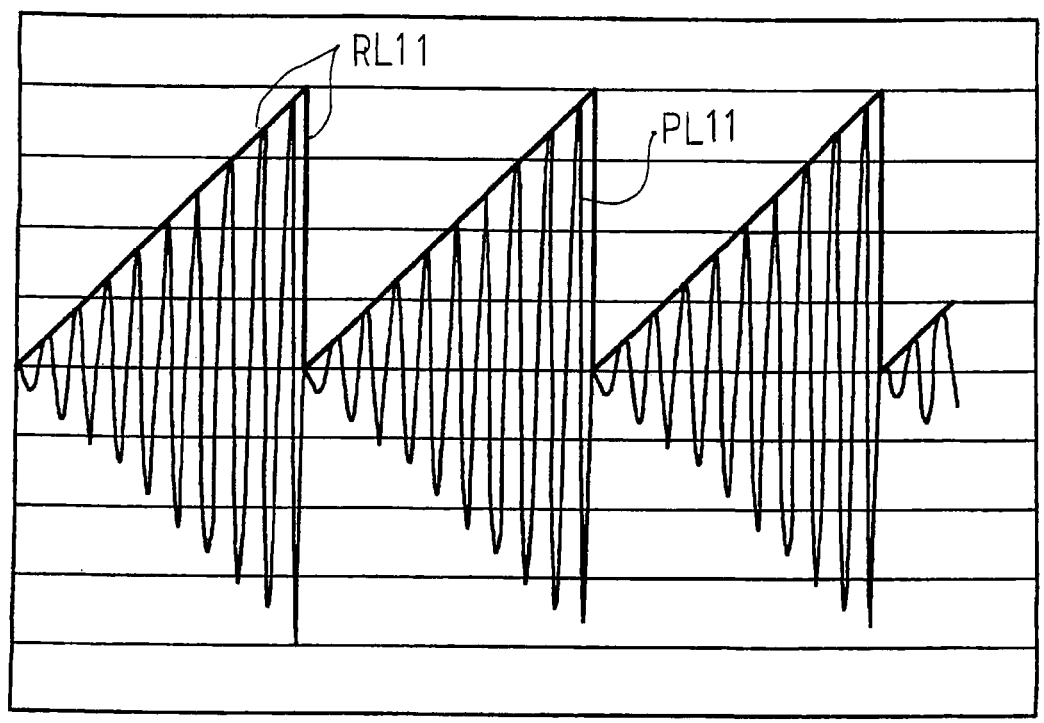
FIG. 11 is a graph showing vibration waveform produced in the automatic player piano.

When the central processing unit admits the inconsistency between the target pedal position and the current pedal position, the motion controller 12c produces a control signal, and supplies the control signal through the servo controller 12b and amplitude modulation circuit 11bc to the pulse width modulator 11Bb. In this instance, the control signal has a constant frequency and a constantly repeated waveform When the difference between the target pedal position and the current pedal position has a negative value, the control signal is subjected to the amplitude modulation, and the modulated control signal has the waveform as indicated by plots PL11 in FIG. 11. Real lines RL11 stand for a serrate envelope of the modulated control signal like the waveform shown in FIG. 9C. The pulse with modulator 11Bb is controlled with the modulated control signal so that the pedals 110a/110b/110c travel on the respective loci similar in waveform to the modulated control signal.

Figure 9D:
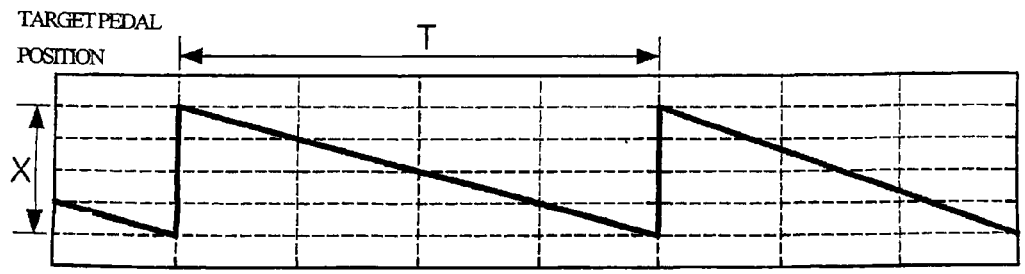

On the other hand, if the difference has a positive value, the envelope of modulated control signal has a serrate envelope like the waveform shown in FIG. 9D.

Thus, event if the control signal has the constant frequency and constantly repeated waveform, the electronic proof system gives the notice expressing the overrun and notice expressing the short stroke to the player. The electronic proof system of the third embodiment makes it possible to give the strong tactile impression through the complicated vibrations.

As will be appreciated from the foregoing description, the electronic proof systems of the present invention monitor the pedals 110a/110b/110c, i.e., manipulators of a musical instrument, and give the notices of incorrect pedaling to the player by moving the pedals during performance on the musical instrument. The player immediately notices the pedal staying at incorrect position, and corrects the pedal position. Thus, the players make progress in playing the musical instrument with the assistance of the electronic proof system of the present invention.

Even if the player does not have good ears, he or she understands the notice through the tactile impression. Moreover, even if the player is continuously reading the music score in the performance, the notice is surely given to the player through the tactile impression.

Although particular embodiments of the present invention have been shown and described, it will be apparent to those skilled in the art that various changes and modifications may be made without departing from the spirit and scope of the present invention.

For example, the black keys 1b, white keys 1c and pedals 110a, 110b and 110c may be monitored with another sort of sensors such as, for example, velocity sensors, acceleration sensors or pressure sensors. This is because of the fact that these sorts of physical quantity are convertible to one another. Even though a certain sort of sensors are installed in the electric system of a musical instrument of the present invention, the output values of certain physical quantity may be converted to another sort of physical quantity. For example, the velocity is calculated from the output values of position sensor as follows. The central processing unit measures regular time intervals with the internal timer, and fetches the pieces of position data from the interface connected to the position sensor at the regular time intervals. The central processing unit calculates the variation of the values of pieces of position data. The variation expresses the velocity. Similarly, the acceleration is calculated from the variation of the values of velocity. From this viewpoint, the pedal event data code may have a velocity data field or an acceleration data field instead of the position data field F3.

Only the electronic proof system may be installed in an acoustic piano. In other words, the automatic playing system, electronic tone generator 25 and silent system are not the indispensable features of the musical instrument of the present invention.

The electronic proof system may be installed in another sort of musical instrument of the type having a manipulator or manipulators, which make an attribute of tones varied depending upon the stroke of manipulator or manipulators. For example, a trombone is equipped with a sliding tube, and a player changes the pitch of tones by changing the length of sliding tube. The electronic proof system may be prepared for the sliding tube. Thus, the automatic player piano does not set any limit to the technical scope of the present invention.

The optical pedal sensors 24 do not set any limit to the technical scope of the present invention. A variable resistor may be used as the pedal sensor 24.

The linkwork 110d may have cams, sprockets and pieces of wire together with the links.

The computer program may be installed from a suitable information storage medium such as, for example, a magnetic tape cassette, a magnetic disk, a flexible disk, an optical disk, an opto-magnetic disk, a compact disk, a DVD (Digital Versatile Disk) and a RAM board to the information processing system 11a/11Aa.

An electronic proof system of the present invention may monitor one of or two of the pedals 110a, 110b and 110c.

In the above-described embodiments, the amplitude of vibrations is proportional to the difference between the current pedal position and the target pedal position. However, this feature does not set any limit to the technical scope of the present invention. An electronic proof system of the present invention may give rise to vibrations with constant amplitude regardless of the difference.

Yet another electronic proof system of the present invention may give rise to vibrations varied in frequency depending upon the amount of difference between the current pedal position and the target pedal position.

The proportionality does not set any limit to the technical scope of the present invention. The relation between the difference and an attribute of vibrations such as the amplitude or frequency may be expressed as a non-linear function.

The current pedal position may be compared with a target pedal range instead of the target pedal position. In detail, the damper pedal effects are imparted to the tones in so far as the damper pedal 110a is fallen within narrow ranges. For example, the full-stroke pedal effect is imparted to the tones after the perfect separation from the strings 4. Even though the current pedal position is inconsistent with the target pedal position, the full-stroke pedal effect is imparted to the tones in so far as the pedal stroke is longer than the critical pedal stroke at which the dampers 6 are perfectly spaced from the strings 4. Similarly, the half-stroke pedal effect is imparted to the tones in so far as the dampers 6 are softly held in contact with the strings 4. Even though the current pedal position is inconsistent with the target pedal position, the half-stroke pedal effect is imparted to the tones as long as the current pedal stroke is fallen within a narrow range around the target pedal position. For this reason, the central processing unit may compare the current pedal position with the target pedal range defined with threshold values at both ends of the target pedal range at step S7. If the current pedal position is fallen within the target pedal range, any notice is given to the player. On the other hand, if the current pedal position is outside of the target pedal range, the electronic proof system gives the notice to the player. In this instance, the difference is indicative of the distance from one of the threshold values.

The target pedal range may be different between the depressed pedal and the released pedal. In this instance, the target pedal range has hysteretic along the locus of pedal.

In the above-described embodiments, the electronic proof system gives the notice to the player at every inconsistency between the current pedal position and the target pedal position. This feature does not set any limit to the technical feature of the present invention. For example, the electronic proof system may give the notice to the player under the condition that the player keeps the pedal at the incorrect position for a predetermined time period. In this instance, if the player notices the pedal staying at an incorrect pedal position by himself or herself, any notice is not required for the player. However, if the player does not correct the pedal position for the predetermined time period, he or she does not notice the incorrect pedal position so that the notice is required for the player.

Similarly, if the player repeats the incorrect pedaling predetermined times, the electronic proof system may give the notice to the player. In this instance, a piece of data indicative of the number of times is memorized in the working memory.

The amplitude modulation circuit 11Bc may be replaced with a frequency modulation circuit or a phrase modulation circuit.

An electronic proof system of the present invention may give plural sorts of information to a player through the notices. In this instance, the amplitude modulation circuit not only gives the different sorts of envelopes to the control signal depending upon the current pedal position with respect to the target position, i.e., the overrun or short stroke but also varies the amplitude of envelope depending upon the amount of difference. Plural sorts of information may be given to the player by using not only an amplitude modulation circuit but also a frequency modulation circuit.

In the above-described embodiments, the electronic proof systems give the notices to the players through the movements of pedals in the up-and-down direction, i.e., the same direction of pedaling. The up-and-down direction does not set any limit to the technical scope of the present invention. An electronic proof system of the present invention may give rise to vibrations of pedals in the lateral direction. In case where a pedal is accompanied with a solenoid-operated pedal actuator for the lateral vibrations or fore-and-aft vibrations together with the solenoid-operated pedal actuator for the up-and-down vibrations, the electronic system selectively gives rise to the vibrations of pedal so as to teach the current relative position of pedal, i.e., the overrun and short-stroke to the player.

An electronic proof system of the present invention may make the tactile impression varied with time. For example, when the central processing unit admits the difference between the current pedal position and the target pedal position, the central processing unit starts the internal clock so as to measure the lapse of time. When the motion controller gives rise to the pedal vibrations, the vibrating pedal merely gives weak tactile impression to the player. However, if the player keeps the pedal at the incorrect position, the motion controller makes the pedal vibrations stronger and stronger with time. The pedals may vibrate at higher frequency or at wider amplitude for the strong tactile impression. The repeated movements may be changed in waveform, frequency or amplitude.

Although the electronic proof systems start the notice immediately after the occurrence of inconsistency between the current pedal position and the target pedal position and stops the notice immediately after the removal of the inconsistency, an electronic proof system of the present invention may give the notice to the player at different timing. For example, the electronic proof system may give rise to the vibrations immediately after removal of inconsistency. Another electronic proof system may give rise to the vibrations immediately after the occurrence of inconsistency, and continues the vibrations for a predetermined time period regardless of removal of inconsistency. Yet another electronic proof system may give rise to the vibrations only when the player can not bring the pedal to the target pedal position in the whole time period of pedal event.

The central processing unit specifies the pedal events on the internal clock continuously incremented by using the time data codes DC in the above-described embodiment. However, an electronic proof system stops the increment of lapse of time while the player continues the incorrect pedaling, and restarts the internal clock when the player corrects the pedal to the target pedal position. In this instance, the event time te is measured on the internal clock as te=t−t0−(td−tc) where t is the present time, t0 is the time at which the player starts the performance, tc is the time at which the player brings the pedal to the incorrect pedal position and td is the time at which the player corrects the pedal to the target pedal position.

Otherwise, the central processing unit successively compares the detected key event and detected pedal event with the key events and pedal events expressed by the event data codes EC. While the comparison is resulting in consistency, the lapse of time until the latest event is equal to the total sum of the time periods expressed in the time data codes DC regardless of player's fingering and pedaling. Therefore, the next event is to occur at the expiry of time period expressed in the time data DC associated with the next event. If the player mistakenly depresses the key or mistakenly depresses the pedal to the incorrect position at the next event time, the central processing unit ignores the inconsistency, and restarts the measurement of time when the player corrects the fingering or pedaling. This feature is desirable for beginners, because the electronic proof system makes itself synchronous with the progress of performance.

The vibrations of pedals do not set any limit to the technical scope of the present invention. An electronic proof system of the present invention may give the notices to the player by changing the load on the foot of player. In this instance, the electronic proof system determines the foot force exerted on the pedal. If the pedal stroke is too short, the solenoid-operated pedal actuator 23 exerts the force on the rear portion of pedal in the upward direction so as partially cancel the elastic force of return spring. The load on player's foot is decreased so that the player notices the pedal staying at a shallow position. On the contrary, if the pedal overruns, the solenoid-operated pedal actuator 23 exerts the force on the rear portion of pedal in the downward direction, the load on player's foot is increased so that the player notices the pedal staying at a deep position. If the solenoid-operated pedal actuator 23 is designed unidirectionally to pull up the rear portion of pedal, the assisting force is removed from the pedal so as to vary the load on player's foot.

The automatic playing system and electronic proof system may be concurrently activated for a player. In this instance, while the human player is performing a melody on the keyboard with the accompaniment of automatic playing system, the electronic proof system monitors the pedals, and gives the human player the notices of incorrect pedaling.

The component parts and job steps are correlated with claim languages as follows. The damper pedal 110a, soft pedal 110b or sostenuto pedal 110c is corresponding to "a manipulator" and "at least one manipulator". In case where the damper pedal 110a serves as the at least one manipulator, the time period over which the tone or tones are continued, is equivalent to "an attribute". In case where the soft pedal serves as the at least one manipulator, the loudness is equivalent to "an attribute". The acoustic tones serve as "music sound".

The working memory in the information processing system 11a, 11Aa or 11Ba serves as "a data storage", and the event data codes expressing the pedal event messages are corresponding to "pieces of music data". The pedal stroke or target pedal position is corresponding to "target variation". The pedal position sensor 23 serves as "a detector", and the pedal stroke or current pedal position is corresponding to "actual variation".

The information processing system 11a/11Aa/11Ba, pulse width modulators 11b/11Bb, amplitude modulation circuit 11Bc job steps S1 to S8 and S11 to S20 form in combination "a controller".

The narrow target pedal range between the threshold values is corresponding to "a movement of said manipulator to the extent that said movement does not change said attribute of music sound", and the play of linkwork is also corresponding to it.

The distance from the target pedal position or current pedal position with respect to the target pedal position is "at least one sort of incorrectness".

The full-stroke pedal effect and half-stroke pedal effect are corresponding to "plural sorts of attribute".

The black keys 1*b*, white keys 1*c*, hammers 2, action units 3, strings 4 and damper units 9 as a whole constitute "a tone generator".

What is claimed is:

1. An electronic proof system for giving a human player a notice of incorrect manipulation on a manipulator manipulated for changing an attribute of music sound, comprising:
    a data storage storing pieces of music data expressing the amount of target variation of said manipulator;
    a detector monitoring said manipulator, and producing pieces of detected data expressing the amount of actual variation of said manipulator;
    an actuator provided for said manipulator, and responsive to a driving signal so as to move said manipulator; and
    a controller having a data processing capability, connected to said data storage, said detector and said actuator, comparing said amount of target variation with said amount of actual variation to see whether or not said manipulator is properly manipulated, and supplying said driving signal to said actuator in the presence of a certain amount of difference between said amount of target variation and said amount of actual variation so as to give said notice through a tactile impression on said manipulator to said human player.

2. The electronic proof system as set forth in claim 1, in which said actuator gives rise to a movement of said manipulator to the extent that said movement does not change said attribute of music sound so as to give said notice of incorrect manipulation when said certain amount of difference takes place.

3. The electronic proof system as set forth in claim 2, in which said movement expresses at least one sort of incorrectness in said incorrect manipulation.

4. The electronic proof system as set forth in claim 3, in which said at least one sort of incorrectness is a difference between said amount of target variation and said amount of actual variation.

5. The electronic proof system as set forth in claim 3, in which said at least one sort of incorrectness is a position of said manipulator at said amount of actual variation on either side of a position of said at least one manipulator at the amount of target variation.

6. The electronic proof system as set forth in 2, in which said movement is vibrations.

7. The electronic proof system as set forth in claim 6, in which an attribute of said vibrations expresses at least one sort of incorrectness in said incorrect manipulation.

8. The electronic proof system as set forth in claim 7, in which said attribute of said vibrations is selected from the group of an amplitude of said vibrations, a frequency of said vibrations and an envelope of the waveform of said vibrations.

9. The electronic proof system as set forth in claim 2, in which said manipulator is connected to a tone generator of a musical instrument producing said music sound having said attribute through a linkwork, and the series combination of said manipulator, said linkwork and said tone generator has a play as wide as or narrower than a range of said movement.

10. A musical instrument for producing music sound, comprising:
    at least one manipulator moved along a trajectory by a human player, and used for changing an attribute of said music sound;
    a tone generator connected to said at least one manipulator, and producing said music sound having said attribute; and
    an electronic proof system giving said human player a notice of incorrect manipulation on said at least one manipulator manipulated for changing said attribute of music sound, and including
    a data storage storing pieces of music data expressing the amount of target variation of said at least one manipulator,
    a detector monitoring said at least one manipulator and producing pieces of detected data expressing the amount of actual variation of said at least one manipulator,
    an actuator provided for said at least one manipulator and responsive to a driving signal so as to move said at least one manipulator and
    a controller having a data processing capability, connected to said data storage, said detector and said actuator, comparing said amount of target variation with said amount of actual variation to see whether or not said manipulator is properly manipulated and supplying said driving signal to said actuator in the presence of a certain amount of difference between said amount of target variation and said amount of actual variation so as to give said notice through a tactile impression on said at least one manipulator to said human player.

11. The musical instrument as set forth in claim 10, in which said at least one manipulator is a pedal on which said human player steps on.

12. The musical instrument as set forth in claim 11, in which plural sorts of said attribute is selectable by means of said pedal depending upon the amount of actual variation indicative of a current position on said trajectory.

13. The musical instrument as set forth in claim 10, in which said actuator gives rise to a movement of said at least one manipulator to the extent that said movement does not change said attribute of music sound so as to give said notice of incorrect manipulation when said certain amount of difference takes place.

14. The musical instrument as set forth in claim 13, in which said movement expresses at least one sort of incorrectness in said incorrect manipulation.

15. The musical instrument as set forth in claim 14, in which said at least one sort of incorrectness is a difference between said amount of target variation and said amount of actual variation.

16. The musical instrument as set forth in claim 14, in which said at least one sort of incorrectness is a position of said at least one manipulator at said amount of actual variation on either side of a position of said at least one manipulator at the amount of target variation.

17. The musical instrument as set forth in 13, in which said movement is vibrations.

18. The musical instrument as set forth in claim 10, further comprising an automatic playing system making said tone generator to produce said music sound without any fingering of human player.

19. The musical instrument as set forth in claim 18, in which said actuator is shared between said electronic proof system and said automatic playing system, and said actuator of said automatic playing system gives rise to another movement so as to change said attribute of said music sound without any force exerted by said human player.

20. The musical instrument as set forth in claim 10, in which said tone generator includes
    keys selectively moved for specifying the pitch of said music sound,
    action units respectively connected to said keys and actuated by the moved keys, strings producing said music sound at different values of said pitch through vibrations thereof, hammers respectively connected to said action units, associated with said strings, respectively, and driving for rotation by the actuated action units so as to give rise to the vibrations of the associated strings, and damper units respectively associated with said strings and moved by said keys so as to be selectively spaced from the associated strings and brought into contact with said strings depending upon the position of said keys.

* * * * *

UNITED STATES PATENT AND TRADEMARK OFFICE
CERTIFICATE OF CORRECTION

PATENT NO. : 7,723,598 B2 Page 1 of 1
APPLICATION NO. : 12/132635
DATED : May 25, 2010
INVENTOR(S) : Tsutomu Sasaki et al.

It is certified that error appears in the above-identified patent and that said Letters Patent is hereby corrected as shown below:

Col. 21, Line 44, Claim 6:
  Insert --claim-- between "in" and "2"
Col. 22, Line 49, Claim 17:
  Insert --claim-- between "in" and "13"
Col. 22, Line 55, Claim 19:
  Insert --said-- between "of" and "human"

Signed and Sealed this

Second Day of November, 2010

David J. Kappos
*Director of the United States Patent and Trademark Office*